United States Patent
Wang et al.

(10) Patent No.: US 11,428,430 B2
(45) Date of Patent: Aug. 30, 2022

(54) AIR CONDITIONING SYSTEM HAVING MULTIPLE OUTDOOR UNITS AND MULTIPLE INDOOR UNITS, METHOD AND DEVICE FOR OPERATING AIR CONDITIONING SYSTEM

(71) Applicant: GREE ELECTRIC APPLIANCES, INC. OF ZHUHAI, Guangdong (CN)

(72) Inventors: Wencan Wang, Zhuhai (CN); Jie Tang, Zhuhai (CN); Weiyou Yu, Zhuhai (CN); Tieying Ye, Zhuhai (CN); Zhongwen Deng, Zhuhai (CN); Dongfeng Lai, Zhuhai (CN); Quanzhou Liu, Zhuhai (CN); Cuiming Ma, Zhuhai (CN); Qiang Huang, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 29 days.

(21) Appl. No.: 17/047,352

(22) PCT Filed: Dec. 12, 2018

(86) PCT No.: PCT/CN2018/120648
§ 371 (c)(1),
(2) Date: Oct. 13, 2020

(87) PCT Pub. No.: WO2019/196462
PCT Pub. Date: Oct. 17, 2019

(65) Prior Publication Data
US 2021/0140669 A1    May 13, 2021

(30) Foreign Application Priority Data
Apr. 13, 2018 (CN) .......................... 201810333183.7

(51) Int. Cl.
*F24F 11/56* (2018.01)
*F24F 11/58* (2018.01)
(Continued)

(52) U.S. Cl.
CPC ............ *F24F 11/58* (2018.01); *F24F 1/0003* (2013.01); *F24F 11/30* (2018.01); *F24F 11/56* (2018.01); *F24F 1/06* (2013.01)

(58) Field of Classification Search
CPC .... F24F 1/0003; F24F 1/06; F24F 1/32; F24F 11/54; F24F 11/57; F24F 11/58
See application file for complete search history.

(56) References Cited

U.S. PATENT DOCUMENTS 5,630,324 A * 5/1997 Yoshida ................. F24F 3/065
62/175
6,453,689 B2 * 9/2002 Wada ................. G05B 19/0421
62/175
(Continued)

FOREIGN PATENT DOCUMENTS

CN  101377330 A  3/2009
CN  101424424 A  5/2009
(Continued)

OTHER PUBLICATIONS

Extended European Search Report for European Application No. 18914764.8 dated Jan. 29, 2021 (7 pages).
(Continued)

*Primary Examiner* — Jerry-Daryl Fletcher
*Assistant Examiner* — Daniel C Comings
(74) *Attorney, Agent, or Firm* — Brandon V. Zuniga; James R. Gourley; Carstens & Cahoon, LLP

(57) ABSTRACT

The present disclosure discloses an air conditioning system, an operating method and an operating device of the air conditioning system. The air conditioning system includes
(Continued)

multiple outdoor units and multiple indoor units. The multiple indoor units include a first indoor unit configured to have wired communication and a second indoor unit configured to have wireless communication. The multiple outdoor units includes a first model outdoor unit connected with the first indoor unit configured to have wired communication, a second model outdoor unit corresponding to the second indoor unit, and a main outdoor unit configured to receive communication information from the first indoor unit and/or the second indoor unit, determine a target outdoor unit for communication on the basis of the communication information, and send the communication information to the target outdoor unit for communication.

15 Claims, 2 Drawing Sheets

(51) Int. Cl.
*F24F 1/06* (2011.01)
*F24F 11/30* (2018.01)
*F24F 1/0003* (2019.01)

(56) References Cited

U.S. PATENT DOCUMENTS

| | | | |
|---|---|---|---|
| 2006/0144064 A1* | 7/2006 | Choe | F24F 11/30 62/230 |
| 2015/0280934 A1 | 10/2015 | Fujiwara et al. | |
| 2018/0266721 A1* | 9/2018 | Yu | F24F 11/86 |

FOREIGN PATENT DOCUMENTS

| | | |
|---|---|---|
| CN | 101936592 A | 1/2011 |
| CN | 108488914 A | 9/2018 |
| EP | 3076093 A1 | 10/2016 |

OTHER PUBLICATIONS

International Search Report for International Application No. PCT/CN2018/120648 dated Feb. 18, 2019 (2 pages).

* cited by examiner

AIR CONDITIONING SYSTEM HAVING MULTIPLE OUTDOOR UNITS AND MULTIPLE INDOOR UNITS, METHOD AND DEVICE FOR OPERATING AIR CONDITIONING SYSTEM

CROSS-REFERENCE TO RELATED APPLICATION

This application is a U.S. National Stage of International Application No. PCT/CN2018/120648, filed on Dec. 12, 2019, and published as WO 2019/196462 on Oct. 17, 2019, which claims priority benefits from Chinese Patent Application No. 201810333183.7, filed on Apr. 13, 2018, entitled "AIR CONDITIONING SYSTEM, OPERATING METHOD AND OPERATING DEVICE OF AIR CONDITIONING SYSTEM" Each application, publication, and patent listed in this paragraph are hereby incorporated by reference in their entireties.

TECHNICAL FIELD

The present disclosure relates to the technical field of air conditioning control, in particular, to an air conditioning system, an operating method and an operating device of the air conditioning system.

BACKGROUND

In conventional multi-split air conditioning system, the air conditioning system generally includes apparatuses such as air conditioning indoor units, air conditioning outdoor units, and wired controllers. Such apparatuses generally adopt communication means including communication wires. The communication wires need to be specially deployed along with mounting of the corresponding apparatuses, or need to be redeployed when adding additional indoor unit.

SUMMARY

Embodiments of the present disclosure provides an air conditioning system, an operating method and an operating device of the air conditioning system.

According to an aspect of the present disclosure, an air conditioning system is provided. The air conditioning system includes a plurality of outdoor units and a plurality of indoor units. The plurality of indoor units includes a first indoor unit configured to have wired communication and a second indoor unit configured to have wireless communication. The plurality of outdoor units includes a first model outdoor unit connected to the first indoor unit configured to have wired communication, a second model outdoor unit corresponding to the second indoor unit, and a main outdoor unit configured to receive communication information from the first indoor unit and/or from the second indoor unit, determine a target outdoor unit for communication from the outdoor units according to the communication information, and send the communication information to the target outdoor unit for communication.

According to another aspect of the present disclosure, a method for operating an air conditioning system is further provided. The method is applicable to any air conditioning system as described above, and includes:

determining a target communication method of an indoor unit to be matched, wherein the target communication method includes at least one of wired communication and wireless communication;

when determining that the target communication method is the wired communication, searching for a first model outdoor unit matching the indoor unit to be matched via a first wired controller, and establishing a communication link between the indoor unit to be matched and the first model outdoor unit;

when determining that the target communication mode is the wireless communication, searching for a second model outdoor unit matching the indoor unit to be matched via a second wired controller, and establishing a communication link between the indoor unit to be matched and the second model outdoor unit.

According to another aspect of the present disclosure, an operating device of an air conditioning system is further provided. The operating device is applicable to any air conditioning system as described above, and includes a determining unit, a first searching unit, and a second searching unit. The determining unit is configured to determine a target communication method of an indoor unit to be matched, wherein the target communication method includes at least one of wired communication and wireless communication. The first searching unit is configured to, after determining that the target communication method is the wired communication, search for a first model outdoor unit matching the indoor unit to be matched via a first wired controller, and establish a communication link between the indoor unit to be matched and the first model outdoor unit. The second searching unit is configured to, after determining that the target communication method is the wireless communication, search for a second model outdoor unit matching the indoor unit to be matched via a second wired controller, and establish a communication link between the indoor unit to be matched and the second model outdoor unit.

In the embodiments of the present disclosure, the air conditioning system includes the first indoor unit configured to have wired communication, the second indoor unit configured to have wireless communication, the first model outdoor unit connected to the first indoor unit configured to have wired communication, and the second model outdoor unit corresponding to the second indoor unit. The air conditioning system in the present disclosure not only includes the indoor unit configured to have wired communication, but is also compatible with the indoor unit configured to have wireless communication. So that, when a new indoor unit needs to be added to the system, the new indoor unit can join the corresponding network according to factory setting thereof, thereby establishing networks for wired communication and wireless communication. In the embodiments, the communication method of the air conditioning system includes wired communication and wireless communication, and is no longer limited to a single type. When a new air conditioner is added, wireless networking can be implemented to realize the communication among wired communication apparatuses and wireless communication apparatuses in the multi-split apparatuses, such that the air conditioning system can operate normally without special wire deployment, thereby reducing the time for deploying the wires, and improving working efficiency.

BRIEF DESCRIPTION OF THE DRAWINGS

The accompany drawings illustrated herein forming a part of the present application are used to provide a further understanding of the present disclosure. The exemplary embodiments of the present disclosure and descriptions thereof are used to explain the present disclosure, but not intended to constitute an improper limitation of the present disclosure.

DETAILED DESCRIPTION OF THE EMBODIMENTS

Figure 1:
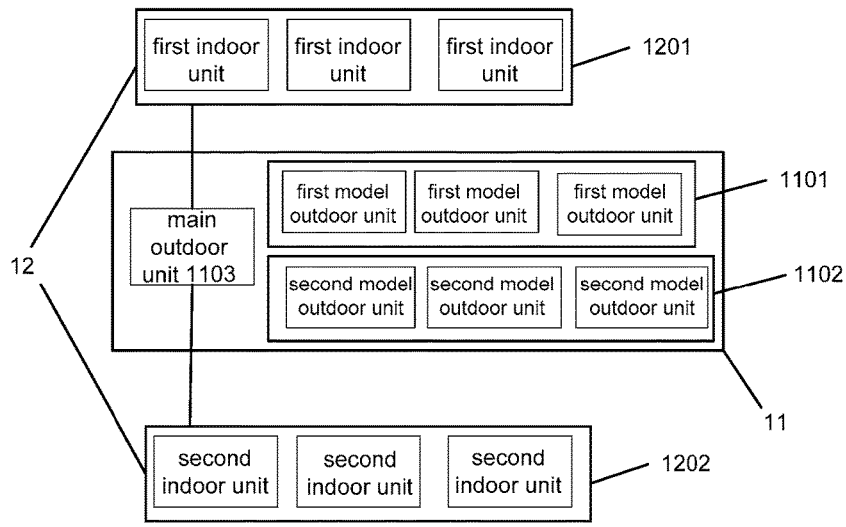
FIG. 1 is a schematic view of an air conditioning system according to an embodiment of the present disclosure.

In order to assist those skilled in the art to better understand the solutions of the present disclosure, the technical solutions in the embodiments of the present disclosure will be described clearly and completely with reference to the accompanying drawings in the embodiments of the present disclosure. Apparently, the described embodiments are only some, but not all embodiments, of the present disclosure. Based on the embodiments of the present disclosure, all other embodiments obtained by those of ordinary skill in the art without creative work shall fall within the protection scope of the present disclosure.

It should be noted that the ordinal terms "first", "second", etc. in the description, the claims, and the drawings of the present disclosure are used to distinguish similar elements, but not used to describe a specific order or precedence. It should be understood that the terms used in this way can be interchangeable under appropriate conditions, such that the embodiments of the present disclosure described herein can be implemented in an order other than the orders illustrated or described herein. In addition, the terms "comprise", "have" and any variations thereof are intended to cover a non-exclusive inclusion. For example, a process, method, system, product, or device that includes a series of steps or units is not limited to those steps or units listed clearly, but can include other steps or units, which are not clearly listed, or which are inherent to the process, method, product or device.

To facilitate users to understand the present disclosure, some terms or nouns involved in the embodiments of the present disclosure are explained below.

Power line communication (PLC) is a unique communication means for power systems. PLC refers to a technology that uses existing power lines to transmit analog or digital signals at a high speed by carrier waves.

The following embodiments of the present disclosure can be applied to various multi-split air conditioning systems. The multi-split air conditioning system includes apparatuses such as indoor units, outdoor units, and wired controllers. In related art, the multi-split air conditioning system implements the communication by means of wired communication. The communication wires need to be specially deployed along with mounting of the corresponding apparatuses. The deployment of the communication wires may damage the original building and installation or disfigure the building. Moreover, connecting the indoor unit and the outdoor unit of the air conditioner by means of wired communication consumes a lot of time and is inefficient. At present, no effective solution has been proposed yet to address the technical problem in the above-mentioned related art that only employing wired communication costs relatively more time in deploying wires and affects working efficiency. The multi-split air conditioning system of the following embodiments of the present disclosure can implement wireless communication. When a new air conditioning indoor unit or a new air conditioning outdoor unit is to be added, it can be wireless networked, so that normal communication among air conditioners with wired communication and air conditioners without communication wires can be realized to save the time for deploying wires and increase working efficiency.

Embodiment 1

FIG. 1 is a schematic view of an air conditioning system according to an embodiment of the present disclosure. As shown in FIG. 1, the air conditioning system includes a plurality of outdoor units 11 and a plurality of indoor units 12. The plurality of indoor units 12 include first indoor units 1201 configured to have wired communication and second indoor units 1202 configured to have wireless communication. The plurality of outdoor units 11 include:

first model outdoor units 1101 connected to the first indoor units configured to have wired communication;

second model outdoor units 1102 corresponding to the second indoor units;

a main outdoor unit 1103 configured to receive communication information from the first indoor units 1201 and/or from the second indoor units 1202, determine a target outdoor unit for communication according to the communication information, and send the communication information to the target outdoor unit for communication.

The first indoor units and the first model outdoor units can implement a wired networking communication therebetween, while the second indoor units and the second model outdoor units can implement a wireless networking communication therebetween. When a new air conditioning indoor unit is to be added, it can be directly set as a second indoor unit, and there is no need to redeploy the communication wire for the additional indoor unit.

In addition, the main outdoor unit 1103 can be an outdoor unit connected to both the wired communication network and the wireless communication network. The main outdoor unit 1103 can be used as a transceiver in the communication networks to perform information conversion. After receiving communication data from the first indoor units or the second indoor units, the main outdoor unit 1103 can send the communication data to the target outdoor unit for communication, so as to establish a communication link between the indoor unit and the outdoor unit.

In the air conditioning system, the air conditioning system includes the first indoor units 1201 configured to have wired communication, the second indoor units 1202 configured to have wireless communication, the first model outdoor units 1101 connected to the first indoor units configured to have wired communication, and the second model outdoor units 1102 corresponding to the second indoor units. The air conditioning system in the present disclosure not only includes indoor units configured to have wired communication, but also is compatible with indoor units configured to have wireless communication. So that, when a new indoor unit needs to be added to the system, the new indoor unit can join the corresponding network according to factory setting thereof, thereby establishing networks for wired communication and wireless communication. In the embodiments, the communication method of the air conditioning system includes wired communication and wireless communication, and is no longer limited to a single type. When a new air conditioner is added, wireless networking can be implemented to realize the communication among wired communication apparatuses and wireless communication apparatuses in the multi-split devices, such that the air conditioning system can operate normally without special wire deployment, thereby reducing the time for deploying the wires, and improving working efficiency. Thus, the problem that only employing single wired communication in related art costs relatively more time in wire deployment and affects working efficiency is solved.

In an embodiment, a wired communication network is established among the plurality of first indoor units and first model outdoor units connected to the first indoor units. A power line communication (PLC) network is established among the plurality of second indoor units and the second model outdoor units matched with the second indoor units. That is, in the above-described embodiment, the second indoor units and the second model outdoor units can establish the PLC network. In the present disclosure, the PLC network can implement the communication among the multi-split apparatuses using existing power lines by connecting all air conditioning apparatuses for PLC communication with the power lines. In this way, it is not necessary to separately provide the communication wires, reducing the deployment of the communication wires. The above-mentioned wired communication network includes at least one of CAN wired communication network, RS485 wired communication network, and HBS wired communication network. All air conditioning apparatuses are connected to a bus of the wired communication network through a plurality of communication wires to realize the wired communication among the air conditioning apparatuses.

In the above embodiments, the wired communication network and the PLC network can be established in the multi-split air conditioning apparatuses, and the communication information of the air conditioner indoor units received by the two communication networks is finally sent to the target air conditioner outdoor unit through the main outdoor unit to achieve analysis and distribution of data.

Optionally, the main outdoor unit can include a communication wire transceiver device configured to exchange communication data with the first indoor units having communication wires; a wireless communication modulator configured to exchange communication data with the second indoor units configured to have wireless communication, and forward a communication signal to a first target outdoor unit after receiving the communication signal sent by the second indoor units.

That is, with respect to the wired communication network, the main outdoor unit can have the communication wire transceiver device. The communication wire transceiver device can receive data information sent by the first indoor units via the communication wire, and send the data information to the target outdoor unit. With respect to the wireless communication network, the main outdoor unit can have the wireless communication modulator. The wireless communication modulator can receive the wireless communication information sent by the second indoor units via the power lines, and send the wireless communication information to the second model outdoor units. Optionally, the wireless communication modulator can be a PLC modulator. The PLC modulator can be used as a central coordinator (COO) of the entire PLC network. Each of the air conditioning apparatuses in the PLC network can receive and send the communication data via the power lines. If an apparatus needs to send data to a specific target apparatus, the data can be forwarded to the corresponding target apparatus via the PLC modulator. The target apparatus in the embodiment of the present disclosure can include not only the indoor units, but also the devices such as the wired controllers, debuggers, and centralized controllers in the network.

In an embodiment, the main outdoor unit is configured to assign a unique identification code for the target indoor unit after receiving the communication information transmitted from the target indoor unit. That is, the indoor units can be identified by the unique identification codes. In the embodiments of the present disclosure, the identification information of the target indoor unit is not limited. In addition to the unique identification code, the identification information of the target indoor unit can be other identification information, such as identification symbols, identification letters, identification numbers, etc.

Optionally, after assigning the unique identification code for the target indoor unit, the main outdoor unit allocates the target network IP address to the target indoor unit via the wired communication network and/or the PLC network. Each target network IP address is unique and determined. In the embodiment of the present disclosure, the automatic allocation of the IP address of the indoor unit can be realized. After recognizing the information of the indoor unit, the main outdoor unit can identify each indoor unit via the unique identification code, and allocate the IP address via the wired communication network or the wireless communication network, while ensuring the uniqueness of the IP address of each apparatus. Each apparatus node can have a unique IP address to ensure the normal operation of communication.

Optionally, in the embodiments of the present disclosure, when allocating IP addresses, the IP addresses are not only allocated for the indoor units and the outdoor units, but also for other devices, such as wired controllers, debuggers, and centralized controllers. In the present disclosure, the devices during networking can be allocated with the corresponding network IP addresses, so as to realize fast and effective transmission of the communication information.

In the present disclosure, after the unique identification code of the second indoor unit are determined, a communication link between the second indoor unit and the second model outdoor unit is established by matching the second model outdoor unit with the corresponding unique identification code via the PLC network. That is, the networking and pairing of the PLC network can be implemented. In the PLC network, the indoor unit can be identified by the unique identification code, and then the communication link between the indoor unit and the outdoor unit can be established. The multi-split air conditioning system includes multiple communication networks. Each set of the indoor units and the outdoor unit matching the each set of the indoor units establish a communication network to achieve an effective communication link.

Optionally, in the embodiments of the present disclosure, the PLC networking method is not limited to the above-mentioned implementation, as long as the indoor units can be connected to the main outdoor unit of the plurality of outdoor units, and then the communication link between the main outdoor unit and each indoor unit can be realized. Moreover, in the present disclosure, a communication link between the wired controller and the indoor unit is established, so that the wired controller is matched with the outdoor unit corresponding to the indoor unit, and the wired controller can control the indoor unit.

It should be noted that the air conditioning system can further include a central controller configured to receive first indoor unit information sent by the plurality of first indoor units and transmitted by the wired communication network, and second indoor unit information sent by the plurality of second indoor units and transmitted by the PLC network. After receiving the first indoor unit information or the second indoor unit information, the central controller is configured to analyze the first indoor unit information or the second indoor unit information to obtain an analysis result, and send the analysis result to a second target outdoor unit. That is, the central controller can be used to receive the communication data sent by the indoor units, analyze the received communication data, verify address information of the target outdoor unit, and send the analyzed data to the target outdoor unit corresponding to the address information. Optionally, the second target outdoor unit in this embodiment can be the first model outdoor unit in wired communication and corresponding to the first indoor unit or the second model outdoor unit in wireless communication and corresponding to the second indoor unit.

In an embodiment, the air conditioning system further includes a plurality of first wired controllers connected to the plurality of first indoor units. Each first wired controller receives a control instruction and controls the communication between the first indoor unit and the corresponding first model outdoor unit according to the control instruction. The air conditioning system further includes a plurality of second wired controllers. After the indoor unit information of the second indoor unit to be matched is determined, the second wired controller searches for a third target outdoor unit corresponding to the indoor unit information of the second indoor unit to be matched and establishes a communication link between the second indoor unit to be matched and the third target outdoor unit.

The first wired controller is a device configured to establish a communication link between the first indoor unit and the first model outdoor unit. The first wired controller can obtain the indoor unit information (including physical address of the indoor unit, the model of the indoor unit, the IP address of the indoor unit, and the like) of the indoor unit, and determine the outdoor unit corresponding to the indoor unit information of indoor unit according to the indoor unit information, and establish the communication link between the indoor unit and the outdoor unit. Of course, in the embodiment of the present disclosure, the wired controller can also be configured to obtain the outdoor unit information of the outdoor unit, and determine the indoor unit corresponding to the outdoor unit information of the outdoor unit.

Optionally, the above-mentioned first wired controllers can be devices connected to the first indoor units. Each first indoor unit can be connected to one first wired controller, so as to establish a wired communication link with the first wired controller. The second wired controllers can be connected in the wireless communication network, and can be used as relay devices to establish network connections between the second indoor units and the second model outdoor units.

In addition, the main outdoor unit controls the wired communication network and the PLC network to perform the following operations: data sharing, data processing, data input, and data output.

Optionally, the wired communication network includes at least one of CAN wired communication network, RS485 wired communication network, HBS wired communication network.

Through the above-mentioned embodiments, in order to avoid the difficulty of deploying the wires in networking between the indoor units and the outdoor units, when the newly added indoor unit is to be networked, the wireless communication network can be established via the power line communication (PLC), and there is no need to specially deploy the communication wire, which improves the networking efficiency. Moreover, during the networking, the original wired communication network can be maintained to realize the coexistence of the wired communication network and the wireless communication network. Through a multi-split communication system formed by the two communication networks, the data can be shared in the same system, which can improve the communication capabilities.

Embodiment 2

Figure 2:
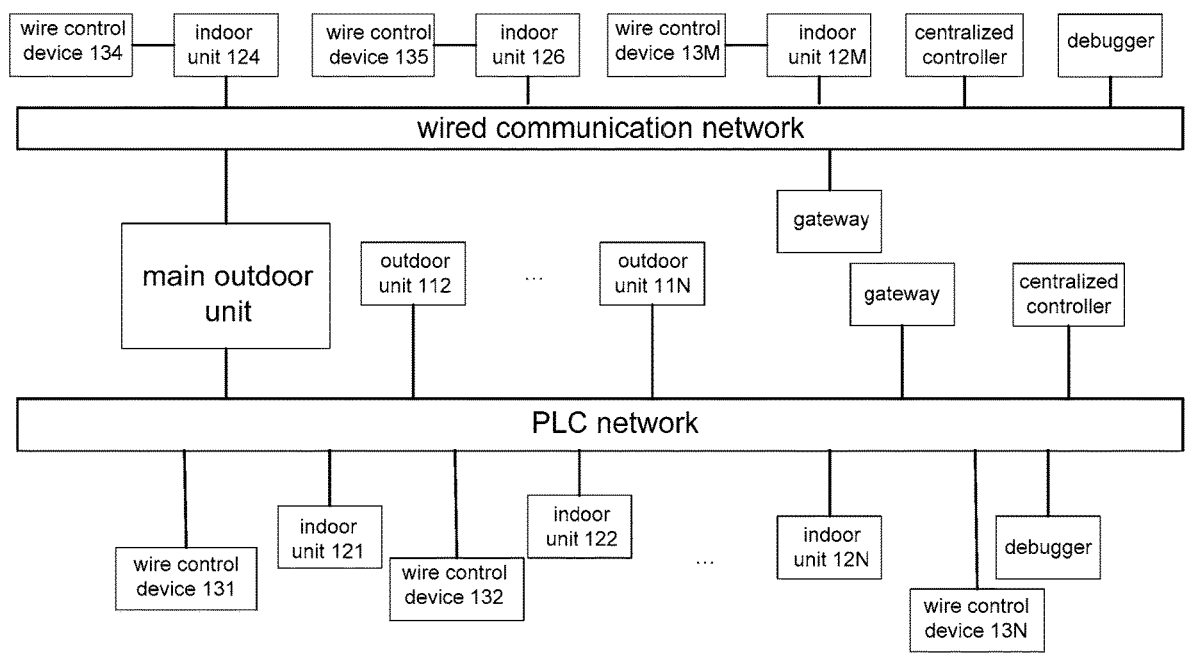
FIG. 2 is a schematic view of an air conditioning system according to another embodiment of the present disclosure.

FIG. 2 is a schematic view of another air conditioning system according to an embodiment of the present disclosure. As shown in FIG. 2, the air conditioning system can include a plurality of indoor units, a plurality of outdoor units, wired controllers, debuggers, and centralized controllers. The air conditioning system includes two communication networks, which respectively are the wired communication network and the PLC network.

The wired communication network can be such as CAN/485/HBS. The wired communication network is connected to the plurality of indoor units, such as an indoor unit 124, an indoor unit 126, . . . an indoor unit 12M as shown in FIG. 2. In addition, the wired communication network is further connected to the centralized controller, debugger, and gateway. The centralized controller can centrally control the indoor units. The debugger can debug during the networking. If an abnormality occurs in the communication, the debugger can perform a debug in time to ensure the normal operation of the communication network. The indoor units in the wired communication network can be respectively connected to the wired controllers. For example, the indoor unit 124 is connected to a wired controller 134, the indoor unit 126 is connected to a wired controller 135, and the indoor unit 12M is connected to a wired controller 13M. The plurality of the indoor units, such as an indoor unit 121, an indoor unit 122, an indoor unit 123, . . . an indoor unit 12N as shown in FIG. 2, can be connected in the PLC network. Moreover, the PLC network can be directly connected to the wired controllers, such as a wired controller 131, a wired controller 132, a wired controller 133, . . . a wired controller 13N, and the like. The PLC network can be further connected to the debugger, the centralized controller and the gateway.

Optionally, the wired communication network and the PLC network are connected to the plurality of outdoor units. The plurality of outdoor units include a main outdoor unit (connected to the wired communication network such as CAN/485/HBS and the PLC network), an outdoor unit 112, . . . an outdoor unit 11N. The main outdoor unit can be an outdoor unit configured to have communication based on the PLC network and have communication based on communication wires, and can be connected to the centralized controller, the debugger, the gateway or the like in the network without the communication wires, and can be connected to the wired communication network. The network communication can be implemented by freely choosing the connection network, so as to realize the centralized control of the air conditioning system, the debugging during installing the air conditioning system, and realize the function of connecting the gateways. The main outdoor unit can include a transceiver device (configured to exchange communication data with the air conditioning apparatus having communication wires) for communication via communication wires (including but not limited to the communication via CAN/RS485/HBS, etc.) and a PLC modulator for PLC communication. As a central coordinator of the entire PLC network, the PLC modulator enables all apparatuses in the PLC network to receive and send data through the power lines. If an apparatus needs to send data to a specific target apparatus, the apparatus send out the data first. After a CCO (that is, the main outdoor unit) receives the data, the CCO forwards the data to the corresponding target apparatus. The target apparatus performs corresponding actions after receiving the data from the CCO.

Optionally, the main outdoor unit can also automatically allocate the IP addresses for the indoor units. Each apparatus node needs to have a unique network address for identification between apparatuses, so as to ensure that each air conditioner in the network is controlled to operate normally. In order to facilitate debugging and installation, in not only the PLC network but also the CAN communication network, the addresses of the indoor units must be automatically identified, not manually. Therefore, the outdoor unit identifies the unique identification code of each indoor unit, and allocates the IP address via the CAN network and the PLC network, respectively, while ensuring that each apparatus has a unique IP that cannot be duplicated.

Embodiment 3

According to an embodiment of the present disclosure, an embodiment of an operating method of an air conditioning system is provided. It should be noted that the steps shown in the flowchart of the accompanying drawings can be performed in a computer system by a set of computer executable instructions. Moreover, although the logical sequence is shown in the flowchart, in some cases, the steps shown or described can be performed in a different order.

Figure 3:
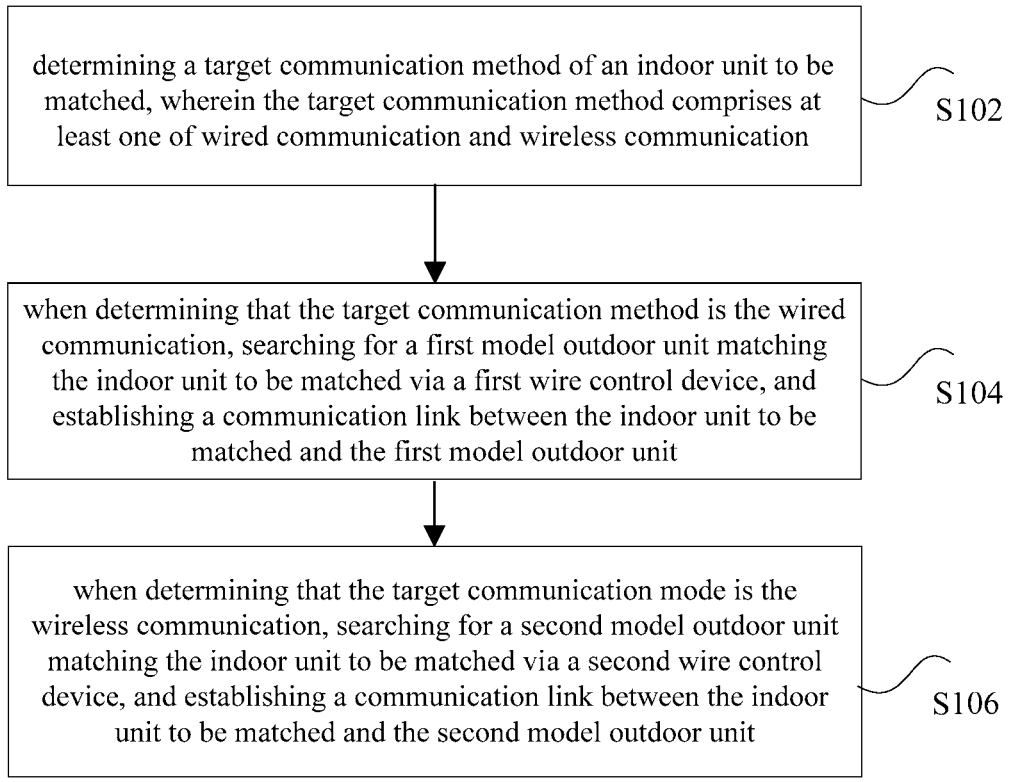
FIG. 3 is a flowchart of an operating method of an air conditioning system according to an embodiment of the present disclosure.

FIG. 3 is a flowchart of an operating method of an air conditioning system according to an embodiment of the present disclosure. The operating method is applicable to any one of the above-described air conditioning systems. As shown in FIG. 3, the operating method includes the following steps.

Step S102, determining a target communication method of an indoor unit to be matched, wherein the target communication method includes at least one of wired communication and wireless communication.

Step S104, when determining that the target communication method is the wired communication, searching for a first model outdoor unit matching the indoor unit to be matched via a first wired controller, and establishing a communication link between the indoor unit to be matched and the first model outdoor unit.

Step S106, when determining that the target communication mode is the wireless communication, searching for a second model outdoor unit matching the indoor unit to be matched via a second wired controller, and establishing a communication link between the indoor unit to be matched and the second model outdoor unit.

Through the above steps, the target communication method of the indoor unit to be matched can be determined. The target communication method includes the wired communication method and the wireless communication method. After the target communication method is determined to be the wired communication, the first model outdoor unit matching the indoor unit to be matched is searched via the first wired controller, and the communication link between the indoor unit to be matched and the first model outdoor unit is established. After the target communication method is determined to be the wireless communication, the second model outdoor unit matching the indoor unit to be matched is searched via the second wired controller, and the communication link between the indoor unit to be matched and the second model outdoor unit is established. In this embodiment, the corresponding communication network can be established by obtaining the communication method of the indoor unit to be matched. If the indoor unit to be matched is configured to have a wired communication network, the wired networking can be implemented through the communication wires. If the indoor unit to be matched is configured to have a wireless communication network, wireless communication networking can be implemented via the wired controller, so as to realize the communication of wired communication apparatus and wireless communication apparatus in multi-split devices. The newly added air conditioning system can be networked wirelessly, and there is no need to deploy the communication wires specially, which reduces the time for deploying wires, and improves work efficiency, thereby solving problems that the only employing wired communication in the related art takes relatively more time in deploying wires and affects working efficiency.

Optionally, the above-mentioned wired communication can include, but is not limited to CAN communication, RS485 communication, HBS communication, or the like. The wireless communication can be the PLC network communication using power lines for communication. When the air conditioning system is networked, the air conditioning system can identify each apparatus of the air conditioner.

In the above-mentioned embodiments of the present disclosure, the main outdoor unit can be provided. The main outdoor unit receives communication information from the indoor units/outdoor units after implementing the wired communication networking and the wireless communication networking, and analyzes the received communication information to determine the target apparatus of the communication information, and obtain the IP address or the physical address of the target apparatus, and send the communication information to the target apparatus.

In the embodiments of the present disclosure, the outdoor unit compatible with wired and wireless communication (based on the PLC communication method) is proposed. On the basis of compatibility with conventional wired communication outdoor units, a communication mechanism without the communication wires is added to implement the normal communication in the air conditioner configured to have wired communication and the air conditioner configured to have wireless communication in the multi-split apparatuses. There is no need to re-deploy the communication wires when adding the indoor units. In addition, this method is compatible with the multi-split air conditioning systems that communicate via the communication wires and have been mass-produced, to avoid the problem that the new air conditioning systems cannot be connected to the air conditioning systems that have been mass-produced and sold.

Embodiment 4

Figure 4:
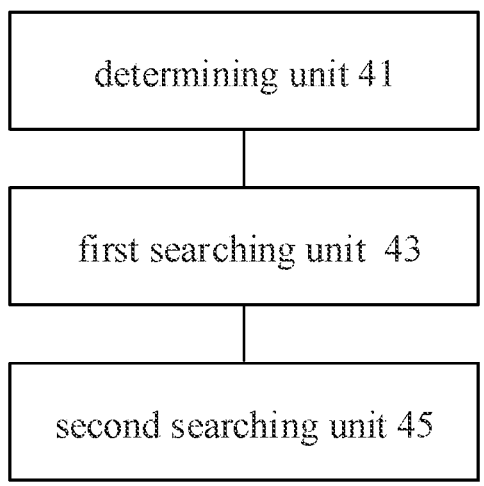
FIG. 4 is a schematic view of an operating device of an air conditioning system according to an embodiment of the present disclosure.

FIG. 4 is a schematic view of an operating device of an air conditioning system according to an embodiment of the present disclosure. The operating device is applicable to any one of the above-described air conditioning systems. The operating device includes a determining unit 41, a first searching unit 43, and a second searching unit 45. The determining unit 41 is configured to determine a target communication method of an indoor unit to be matched. The target communication method includes at least wired communication and wireless communication. The first searching unit 43 is configured to search for a first model outdoor unit matching the indoor unit to be matched via a first wired controller, and establish a communication link between the indoor unit to be matched and the first model outdoor unit after determining that the target communication method is the wired communication. The second searching unit 45 is configured to search for a second model outdoor unit matching the indoor unit to be matched via a second wired controller, and establish a communication link between the indoor unit to be matched and the second model outdoor unit after determining that the target communication method is the wireless communication.

Through the above device, the determining unit 41 determines the target communication method of the indoor unit to be matched. The target communication method includes the wired communication method and the wireless communication method. After the target communication method is determined to be the wired communication, the first searching unit 43 searches the first model outdoor unit matching the indoor unit to be matched via the first wired controller, and establishes the communication link between the indoor unit to be matched and the first model outdoor unit. After the target communication method is determined to be the wireless communication, the second searching unit 45 searches the second model outdoor unit matching the indoor unit to be matched via the second wired controller, and establishes the communication link between the indoor unit to be matched and the second model outdoor unit. In this embodiment, the corresponding communication network can be established by obtaining the communication method of the indoor unit to be matched. If the indoor unit to be matched is configured to have a wired communication, the wired networking can be implemented through the communication wires. If the indoor unit to be matched is configured to have a wireless communication, wireless communication networking can be implemented via the wired controllers, so as to implement the communication of the wired communication apparatuses and wireless communication apparatuses in the multi-split apparatuses. The newly added air conditioner can be networked wirelessly, and there is no need to specially deploy the communication wires, which reduces the time for deploying wires, and improves working efficiency, thereby solving the problem that only employing wired communication in the related art takes relatively more time in wire deployment and affects working efficiency.

The reference numbers of the above-mentioned embodiments of the present disclosure are for description only, and do not indicate the advantages and disadvantages of the embodiments.

In the above-mentioned embodiments of the present disclosure, the description of each embodiment has its own focus. For parts that are not described in detail in an embodiment, reference can be made to related description of other embodiments.

In the embodiments provided in the present disclosure, it should be understood that the disclosed technical contents can be implemented in other ways. The above-described embodiments for products are merely illustrative. For example, the units may be classified according to a logical function here, whereas may be classified by other classification methods in actual implementation. For example, a plurality of the units and components may be combined or integrated into another system, or some features may be ignored or not implemented. In addition, the shown or described mutual coupling or direct coupling or communication link may be indirect coupling or communication link via some interfaces, units or modules, and may be in electrical or other forms.

The units described as separate components may or may not be physically separated from each other, and the components shown as units may or may not be physical units; that is, they may be located in one place, or they may be distributed on multiple units. Some or all of the units can be selected according to actual needs to achieve the purposes of the solutions of the embodiments.

In addition, various functional units in the various embodiments of the present disclosure may be integrated into one processing unit, or each unit may physically exist alone, or two or more units may be integrated into one unit. The above-mentioned integrated unit may be implemented in a form of a hardware or a software functional unit.

When the integrated unit is implemented in the form of a software functional unit and sold or used as an independent product, the integrated unit can be stored in a computer-readable storage medium. Based on this understanding, the technical solutions of the present disclosure essentially, or the part thereof that contributes to the related art, or all or some of the technical solutions can be implemented in the form of a software product. The computer software product is stored in a storage medium, and includes several instructions for instructing a computer device (which may be a personal computer, a server, a network device, or the like) to perform all or some of the steps of the method in each embodiment of the present disclosure. The above-mentioned storage medium includes a medium that can store program codes, such as a USB flash drive, a read-only memory (ROM), a random access memory (RAM), a removable hard disk, a magnetic disk, or an optical disk.

The above description is only for the embodiments of the present disclosure. It should be noted that for those of ordinary skill in the art, some improvements and modifications can be made without departing from the principle of the present disclosure, and these improvements and modifications also should be regarded as falling within the protection scope of the present disclosure.

Industry Significance

The solutions provided in the embodiments of the present disclosure can be used to establish wired and wireless communication networks in the air conditioning system. In the technical solutions provided in the embodiments of the present disclosure, the communication method of the air conditioning system includes the wired communication and the wireless communication, and is no longer limited to a single type. When a new air conditioner is added, wireless networking can be implemented to realize the communication among wired communication apparatuses and wireless communication apparatuses in the multi-split apparatuses, such that the air conditioning system can operate normally without special wire deployment, thereby reducing the time for deploying the wires, and improving working efficiency. Thus, the problem that only employing wired communication in the related art costs relatively more time in wire deployment wires and affects working efficiency is solved.

What is claimed is:

1. An air conditioning system, comprising a plurality of outdoor units and a plurality of indoor units, the plurality of indoor units comprising at least one first indoor unit configured to have wired communication and at least one second indoor unit configured to have wireless communication, the plurality of outdoor units comprising:

at least one first model outdoor unit connected to the at least one first indoor unit;

at least one second model outdoor unit configured to communicate with the at least one second indoor unit;
a main outdoor unit configured to receive communication information from at least one of the at least one first indoor unit and the at least one second indoor unit, determine a target outdoor unit for communication from the plurality of outdoor units according to the communication information, and send the communication information to the target outdoor unit for communication.

2. The air conditioning system of claim 1, wherein the main outdoor unit comprises:
a communication wire transceiver device configured to exchange communication data with the at least one first indoor unit through a communication wire;
a wireless communication modulator comprising a first computer, the first computer comprising a first computer-readable storage medium storing first instructions; by executing the first instructions, the first computer being capable of performing steps comprising:
exchanging communication data with the at least one second indoor unit through the wireless communication, and forwarding a communication signal to the target outdoor unit after receiving the communication signal sent by the at least one second indoor unit.

3. The air conditioning system of claim 1, wherein the at least one first indoor unit is a plurality of first indoor units, the at least one first model outdoor unit is a plurality of first model outdoor units, the at least one second indoor unit is a plurality of second indoor units, the at least one second model outdoor unit is a plurality of second model outdoor units, a wired communication network is established among the plurality of first indoor units and the plurality of first model outdoor units connected to the plurality of first indoor units; and a power line communication (PLC) network is established among the plurality of second indoor units and the plurality of second model outdoor units matching the plurality of second indoor units.

4. The air conditioning system of claim 3, further comprising a central controller configured to:
receive first indoor unit information sent by the at least one first indoor unit and transmitted by the wired communication network, and second indoor unit information sent by the at least one second indoor unit and transmitted by the PLC network, and
after receiving the first indoor unit information or the second indoor unit information, analyze the first indoor unit information or the second indoor unit information to obtain an analysis result, and send the analysis result to the target outdoor unit.

5. The air conditioning system of claim 3, further comprising:
(i) a plurality of first wired controllers connected to the plurality of first indoor units, each of the plurality of first wired controllers comprising a second computer, the second computer comprising a second computer-readable storage medium storing second instructions; by executing the second instructions, the second computer being capable of performing steps comprising:
receiving a control instruction and controlling communication between the at least one first indoor unit and the at least one first model outdoor unit connected to the at least one first indoor unit according to the control instruction; and
(ii) a plurality of second wired controllers, each of the plurality of second wired controllers comprising a third computer, the third computer comprising a third computer-readable storage medium storing third instructions; by executing the third instructions, the third computer being capable of performing steps comprising:
after determining second indoor unit information of a second indoor unit to be matched, the at least one second indoor unit comprising the second indoor unit to be matched, searching for the target outdoor unit, the target outdoor unit corresponding to the second indoor unit information of the second indoor unit to be matched, and establishing a communication link between the second indoor unit to be matched and the target outdoor unit.

6. The air conditioning system of claim 5, wherein each of the plurality of first wired controllers is configured to obtain first indoor unit information of the at least one first indoor unit, the first indoor unit information comprises physical address of the at least one first indoor unit, model of the indoor unit, and IP address of the at least one first indoor unit.

7. The air conditioning system of claim 5, wherein each of the plurality of first wired controllers is configured to determine the target outdoor unit when the target outdoor unit corresponds to first indoor unit information of the at least one first indoor unit, and establish a communication link between the at least one first indoor unit and the target outdoor unit.

8. The air conditioning system of claim 5, wherein the plurality of second wired controllers are connected in a wireless communication network, and are relays to establish network connections between the at least one second indoor unit and the at least one second model outdoor unit.

9. The air conditioning system of claim 3, wherein the main outdoor unit is configured to assign a unique identification code for a target indoor unit after receiving the communication information.

10. The air conditioning system of claim 9, wherein the main outdoor unit is configured to, after assigning the unique identification code for the target indoor unit, allocate a target network IP address to the target indoor unit via at least one of the wired communication network and the PLC network, wherein each target network IP address is unique and determined.

11. The air conditioning system of claim 9, wherein the air conditioning system is configured so that after the unique identification code is determined, the unique identification code being a unique identification code of the at least one second indoor unit, a communication link between the at least one second indoor unit and the at least one second model outdoor unit is established by matching the at least one second model outdoor unit with the unique identification code via the PLC network.

12. The air conditioning system of claim 3, wherein the main outdoor unit is configured to control the wired communication network and the PLC network to perform the following operations: data sharing, data processing, data input, and data output.

13. The air conditioning system of claim 3, wherein the wired communication network comprises at least one network selected from the group consisting of CAN wired communication network, RS485 wired communication network, and HBS wired communication network.

14. A method for operating the air conditioning system of claim 1, comprising:
determining a target communication method of an indoor unit to be matched, the plurality of indoor units comprising the indoor unit to be matched, wherein the target communication method comprises at least one of wired communication and wireless communication;

when determining that the target communication method is the wired communication, searching via a first wired controller for a matching first model outdoor unit of the at least one first model outdoor unit, the matching first model outdoor unit matching the indoor unit to be matched, and establishing a communication link between the indoor unit to be matched and the matching first model outdoor unit; and when determining that the target communication method is the wireless communication, searching via a second wired controller for a matching second model outdoor unit of the at least one second model outdoor unit, the matching second model outdoor unit matching the indoor unit to be matched, and establishing a communication link between the indoor unit to be matched and the matching second model outdoor unit.

15. An operating device of the air conditioning system of claim 1, the operating device comprising a fourth computer, the fourth computer comprising a fourth computer-readable storage medium storing fourth instructions; by executing the fourth instructions, the fourth computer being capable of performing steps comprising:

determining a target communication method of an indoor unit to be matched, the plurality of indoor units comprising the indoor unit to be matched, wherein the target communication method comprises at least one of wired communication and wireless communication;

after determining that the target communication method is the wired communication, searching via a first wired controller for a matching first model outdoor unit of the at least one first model outdoor unit, the matching first model outdoor unit matching the indoor unit to be matched, and establishing a communication link between the indoor unit to be matched and the matching first model outdoor unit;

after determining that the target communication method is the wireless communication, searching via a second wired controller for a matching second model outdoor unit of the at least one second model outdoor unit, the matching second model outdoor unit matching the indoor unit to be matched, and establishing a communication link between the indoor unit to be matched and the matching second model outdoor unit.

* * * * *